Figure 1:
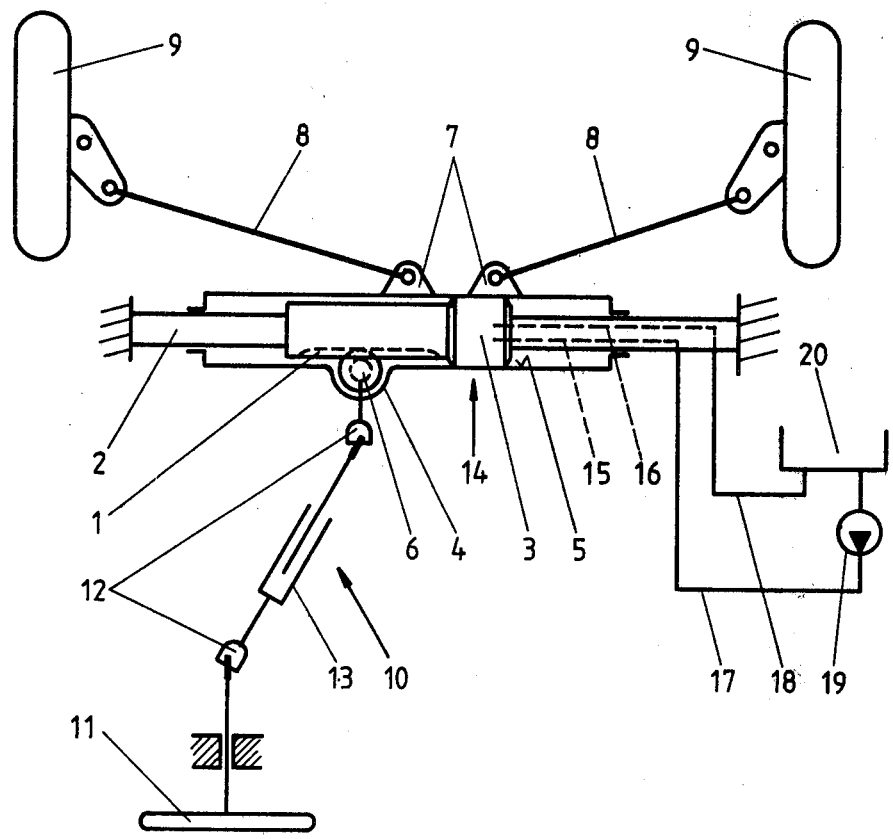

United States Patent [19]

Lang

[11] 4,383,587
[45] May 17, 1983

[54] RACK STEERING GEAR

[75] Inventor: Armin Lang, Schwabisch Gmünd, Fed. Rep. of Germany

[73] Assignee: Zahnradfabrik Friedrichshafen, AG, Friedrichshafen, Fed. Rep. of Germany

[21] Appl. No.: 243,946

[22] PCT Filed: Jul. 11, 1980

[86] PCT No.: PCT/DE80/00102
§ 371 Date: Mar. 3, 1981
§ 102(e) Date: Mar. 3, 1981

[87] PCT Pub. No.: WO81/00239
PCT Pub. Date: Feb. 5, 1981

[30] Foreign Application Priority Data

Jul. 12, 1979 [DE] Fed. Rep. of Germany ....... 2928100

[51] Int. Cl.³ .............................................. B62D 5/10
[52] U.S. Cl. .................................. 180/148; 180/158
[58] Field of Search ...................... 180/148, 158, 162

[56] References Cited

U.S. PATENT DOCUMENTS 3,982,604 9/1976 Crawford ........................ 180/158
4,144,948 3/1979 Sergay ............................ 180/148

FOREIGN PATENT DOCUMENTS

| 652049 | 12/1964 | Belgium. |
| 1137328 | 3/1964 | Fed. Rep. of Germany. |
| 1933403 | 1/1970 | Fed. Rep. of Germany ...... 180/148 |
| 2032183 | 1/1972 | Fed. Rep. of Germany ...... 180/148 |
| 2114591 | 2/1972 | Fed. Rep. of Germany ...... 180/148 |
| 2928099 | 1/1981 | Fed. Rep. of Germany ...... 180/158 |
| 1274434 | 9/1961 | France ............................. 180/148 |

Primary Examiner—John A. Pekar
Attorney, Agent, or Firm—Zalkind & Shuster

[57] ABSTRACT

A power steering arrangement has a booster pressure cylinder shiftable on a piston fixed to the vehicle frame with steering rods connecting from the cylinder to the vehicle wheels. Valve means operable by a manually operated steering wheel pressurizes and exhausts the cylinder chambers at the ends of the piston. The valve means is carried in the piston for compactness and is actuated by a rack reciprocated by a pinion rotated in response to rotation of the manual steering wheel. The arrangement provides the advantage of compact assembly and rugged construction coupled with a minimum of oil leakage from the pressure cylinder. Inasmuch as the piston rod is fixed and has flow passages connecting to pump and tank, attachment of conduits for pressure and exhaust may be readily made. There are no moving conduit parts and tight sealing is achieved. The arrangement effects a desirable geometry of the steering mechanism.

7 Claims, 2 Drawing Figures

RACK STEERING GEAR

BACKGROUND OF THE INVENTION

The shortening of overall lengths of rack steering gears has always presented a problem. Thus in German patent DBP No. 11 37 328, the overall length of the construction is shortened by disposing the control valve in an axial bore of the power piston. The reciprocating drive of the steering mechanism connects to the ends of the piston rods. Due to the required length of stroke of the piston rod, there is insufficient space for the steering rods, particularly in vehicles with a narrow wheel base. Thus the steering rods must be made short and this is a disadvantage in the steering geometry. Another disadvantage in the patented arrangement is that the oil lines to the control valve provide sealing difficulties.

German patent OS No. 19 33 403 shows shortening of the overall arrangement by disposing the booster cylinder alongside the rack. The steering rods are attached at the ends of the rack by means of ball joints, and are relatively short. Additionally, the patented arrangement requires elements of the control valve to rotate with the steering spindle and the pinion which causes sealing problems.

German patent OS No. 20 32 183 shows an arrangement wherein the point of rotation of the ball bearings of the steering rod is inside the rack and shifted within the cylinder through a rolling diaphragm. The gain in length for the steering rods is relatively small.

German patent OS No. 21 14 591 shows an arrangement wherein the steering rods are attached to the rack approximately at the middle of the steering gear. Although the steering rods are not necessarily limited in length, the construction is expensive and the rigidity of the housing is reduced by the slots required for the steering rods.

BRIEF DESCRIPTION

The present invention avoids the disadvantages of the prior art with their sealing complexities by means of bores through a piston rod of the booster piston, the piston rod being fixed to the vehicle frame so that not only is the solidity of the overall construction improved and sealing improved, but the overall dimensions of the power cylinder housing and the piston rod are reduced. By having the power cylinder housing shiftable on the fixed piston rod, a simpler mode of connection between steering rods and wheels is effected and such rods can be made longer in a symmetrical geometry between points of connection with the shiftable booster cylinder housing and the vehicle wheels. This effects a force transmitting advantage.

Specifically, by having the steering rods connected to a reciprocal booster cylinder housing, optimum use of the space available for steering rods can be made so as to enable the invention to utilize longer rods. Additionally, by feeding the chambers of the booster cylinder via bores in a stationary piston rod, no movable connections are required and sealing problems are reduced accordingly.

Figure 2:
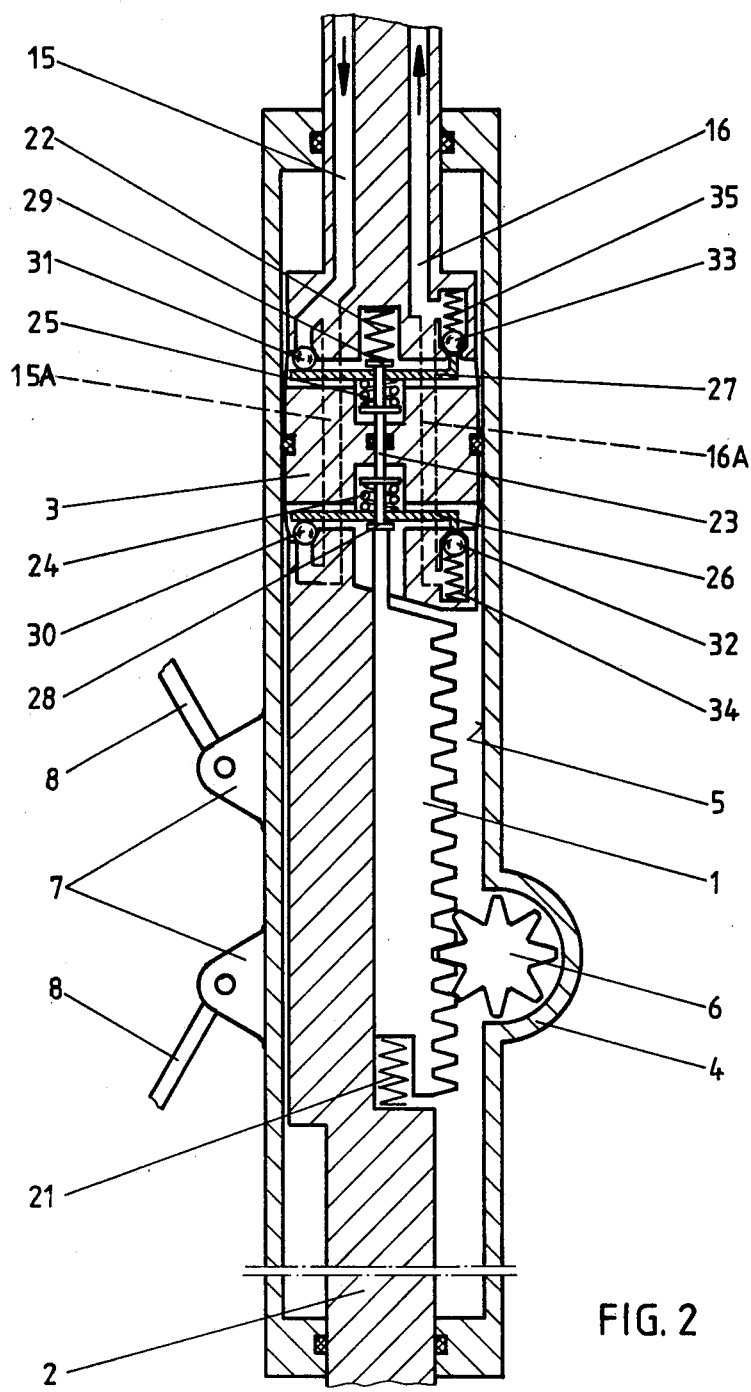

A detailed description of the invention now follows in conjunction with the appended drawing, in which FIG. 1 is a schematic illustration of a rack steering gear embodying the invention, and FIG. 2 is a longitudinal section through the booster cylinder housing showing essential components which comprise the invention.

Referring to the drawing, a rack 1 is slidable on a piston rod 2 of a booster piston 3 reciprocal in a housing 4. The housing is cylindrical in the length traversed by the piston, thus providing a booster cylinder 5. Pinion 6 is rotatably carried in the housing meshing with the rack 1. The piston rod 2 extends sealingly at both ends through the respective ends of the housing and will be understood to be fixed to the frame of a vehicle. Accordingly, while the piston rod is relatively stationary, being secured to the vehicle, the housing 4 can reciprocate on the piston rod for movement relative thereto and the rack is slidable along piston rod 2.

A pair of steering rods 8 are pivotally secured to the housing 4 by means of attachment eyes 7 and are connected at their outer ends to respective wheels 9 in the usual manner for effecting steering. It will be noted that the geometry of the steering rods, the housing, and the attachments to the wheels is symmetrical on each side of the housing. Thus, the steering rod 8 transmits equal steering force to the wheels 9 upon shifting of the housing 4 in either direction.

Pinion 6 carried in the housing 4 as seen in FIG. 1 is connected by a telescopic spindle 10 to steering wheel 11, the connection being a pair of universal joints 12 and slidable elements such as the sleeve 13.

A control valve (FIG. 2), generally designated as 14, is carried in the piston 3 and communicates via a bore passage 15 with a conduit 17 to pump 19. Bore 15 brings pressure to the upper chamber of the cylinder as viewed in FIG. 2.

Likewise as seen in FIG. 2 a bore passage 16 communicates via a conduit 18 with tank 20 for exhaust flow from the upper chamber. It will be noted that bores 15 and 16 are in the piston rod 2.

Piston 3 has a branch bore 15A or passage communicating from bore 15 through the piston for pressure flow to the lower chamber of the cylinder. Likewise, a branch bore 16A through the piston connects to bore 16 for exhaust flow from the lower chamber.

The control valve 14 is operated upon by shifting of rack 1 by the steering wheel 11 in a limited range in either direction relative to piston 3 and piston rod 2. Rack 1 and control valve 14 are maintained in neutral or centered position for straight ahead steering by centering springs 21 and 22 acting against rack 1 in opposite directions.

The rack being slidably nested in the piston rod, and maintained in position by the pinion, will be seen to have a limited reciprocal movement relative to the piston rod, but sufficient for actuation of a control valve such as shown on FIG. 2, or any other type suitable for the purposes of the invention.

From the construction shown in FIG. 2, it will be apparent that the slidable rack is acted on by the spring 21 in one direction and by the spring 22 in the other direction acting through various abutment elements of valve 14 as will be explained. Thus, valve 14 comprises a slidable pin 23 secured to rack 1 and through which pin the springs 21, 22 can act for centering effect on the rack and a neutral position of valve 14. Pin 23 actuates a pair of rockable valve operators 26 and 27 by means of respective operating springs 24 and 25. A pair of respective collars 28 and 29 limit the movement of the springs 24 and 25, each of which will be seen to have an end abutting a respective collar fixed on pin 23.

Ball valves 30 and 31 are pressure inlet valves and ball valves 33 and 32 are exhaust outlet valves. The arrangement is such that one inlet valve and one outlet valve are operated by a valve operator such as 26 or 27. Thus, actuation of valve operator 26 via spring 24 can open outlet valve 32 with the bent end flange of the operator when the operator is pressed down and at the same time hold the pressure inlet valve 30 closed. Similarly, valve operator 27 upon actuation upwardly via spring 25 can open exhaust outlet valve 33 while holding pressure inlet valve 31 closed. It will be understood that a certain degree of play of the valve operators 26, 27 on the pin 23 is permitted to allow for a pivotal or swinging action wherein one end of a valve operator is fulcrumed on a pressure inlet valve 30 or 31 while the other end moves to open the corresponding exhaust outlet valve.

Although exhaust outlet valves 32 and 33 are spring biased by compression springs 34 and 35 toward a closed position, when in neutral or straight ahead steering position, they are open, while pressure inlet valves 30, 31 are closed.

Since the pressure inlet bore 15 and the exhaust return bore 16 communicate via respective bores 15A and 16A, wherein the passage 15A communicates with an upstream side of the pressure inlet valve 30 and the passage 16A communicates with the downstream side of exhaust outlet valve 32, it will be apparent that either pressure chamber can be pressurized while the other is exhausting.

The operation of the control valve 14 need not be described in detail since it is not essential to the operation of the invention which pertains to the shiftable rack operated by the manual steering wheel for effecting shifting of a power cylinder housing connected to steering rods.

Thus, the particular embodiment of the valve 14 as shown herein is not critical and other forms of valves may be used, for example, as shown in German Pat. DE-PS No. 11 37 328 heretofore mentioned.

What is claimed is:

1. In a booster steering gear for a vehicle, of the kind having a housing (4) comprising a booster cylinder (5) with a piston (3) therein on a piston rod (2) extending through the ends of said housing including a rack (1) movable in said housing by a steering wheel and a control valve (14) operable by rack movement for booster power control, including steering force transmission means comprising steering rod means (8) operable by relative movement between said piston and said booster cylinder for vehicle wheel steering movement;
    wherein the improvement comprises said steering rod means having at least one steering rod (8) connected to said housing (4) between the ends thereof; said rack being carried by said piston rod (2); said piston rod (2) comprising means to be fixed to a vehicle frame; said housing being movable on said fixed piston rod to effect steering by actuation of said steering rod.

2. In a booster steering gear as set forth in claim 1, including flow passages comprising bores (15, 16) in said piston rod (2) communicating with said control valve for hydraulic flow communication with said booster cylinder.

3. In a booster steering gear as set forth in claim 1, wherein said rack (1) is slidable on said piston rod (2) and means effecting limited movement relative thereto in either direction for actuation of said control valve.

4. In a booster steering system as set forth in claim 1, wherein said rack (1) is slidable on said piston rod (2) and means effecting limited movement relative thereto in either direction for actuation of said control valve, including opposed springs (21, 22) disposed to act on said rack for effecting a neutral position for straight ahead steering.

5. In a booster gear as set forth in claim 1, including an additional steering rod (8) connected to said housing between the ends thereof, wherein the geometry of said steering rods between points of connection with said housing and wheels of a vehicle is symmetrical.

6. In a booster steering gear for a vehicle, of the kind having a housing comprising a booster cylinder with a piston therein including a rack movable in said housing by a steering wheel and a control valve operable by rack movement for booster power control, including steering force transmission means comprising steering rod means operable by relative movement between said piston and said booster cylinder for vehicle wheel steering movement;
    wherein the improvement comprises said steering rod means having at least one steering rod (8) connected to said housing (4); a piston rod (2) comprising means to be fixed to a vehicle frame; said housing being movable on said fixed piston rod to effect steering by actuation of said steering rod; including means for actuating said rack (1) comprising a pinion (6) carried by said housing and means for rotating said pinion by a steering wheel (11) comprising universally jointed telescopically related members.

7. In a booster steering gear for a vehicle, of the kind having a housing comprising a booster cylinder with a piston therein including a rack movable in said housing by a steering wheel and a control valve operable by rack movement for booster power control, including steering force transmission means comprising steering rod means operable by relative movement between said piston and said booster cylinder for vehicle wheel steering movement;
    wherein the improvement comprises said steering rod means having at least one steering rod (8) connected to said housing (4); a piston rod (2) comprising means to be fixed to a vehicle frame; said housing being movable on said fixed piston rod to effect steering by actuation of said steering rod; including means for actuating said rack (1) comprising a pinion (6) carried by said housing and means for rotating said pinion by a steering wheel (11) comprising universally jointed telescopically related members; wherein said rack (1) is slidable on said piston rod (2) and means effecting limited movement relative thereto in either direction for actuation of said control valve.

* * * * *